(12) United States Patent
Millard

(10) Patent No.: US 7,992,230 B2
(45) Date of Patent: Aug. 9, 2011

(54) DISSOLVING DRAIN PLUG

(76) Inventor: Nancy Millard, Edmonton (CA)

( * ) Notice: Subject to any disclaimer, the term of this patent is extended or adjusted under 35 U.S.C. 154(b) by 1109 days.

(21) Appl. No.: 11/656,264

(22) Filed: Jan. 22, 2007

(65) Prior Publication Data
US 2007/0174954 A1    Aug. 2, 2007

(30) Foreign Application Priority Data
Jan. 27, 2006   (CA) ...................................... 2535439

(51) Int. Cl.
*A47K 1/14* (2006.01)
(52) U.S. Cl. ........................................................ 4/295
(58) Field of Classification Search .............. 4/294, 295; 138/89–90; 73/49.8
See application file for complete search history.

(56) References Cited

U.S. PATENT DOCUMENTS

| | | | |
|---|---|---|---|
| 699,982 A | | 5/1902 | Seabury et al. |
| 2,087,592 A | * | 7/1937 | Chesnut .................... 4/294 X |
| 4,224,701 A | * | 9/1980 | Huang ....................... 4/294 X |
| 5,318,075 A | | 6/1994 | Roll |
| 5,479,986 A | | 1/1996 | Gano et al. |
| 5,795,551 A | | 8/1998 | Powell |
| 5,860,173 A | | 1/1999 | Herring |
| 6,026,903 A | | 2/2000 | Shy et al. |
| 6,267,001 B1 | | 7/2001 | Duncan |
| 6,619,326 B1 | * | 9/2003 | Pryne ........................ 138/89 |
| 2006/0254660 A1 | | 11/2006 | McIlwain |

* cited by examiner

*Primary Examiner* — Lori Baker
(74) *Attorney, Agent, or Firm* — Davis & Bujold, P.L.L.C.

(57) ABSTRACT

A dissolving drain plug includes a body made of a material which is adapted to dissolve within a specific time interval when exposed to a specific liquid solvent.

7 Claims, 1 Drawing Sheet

THE FIGURE
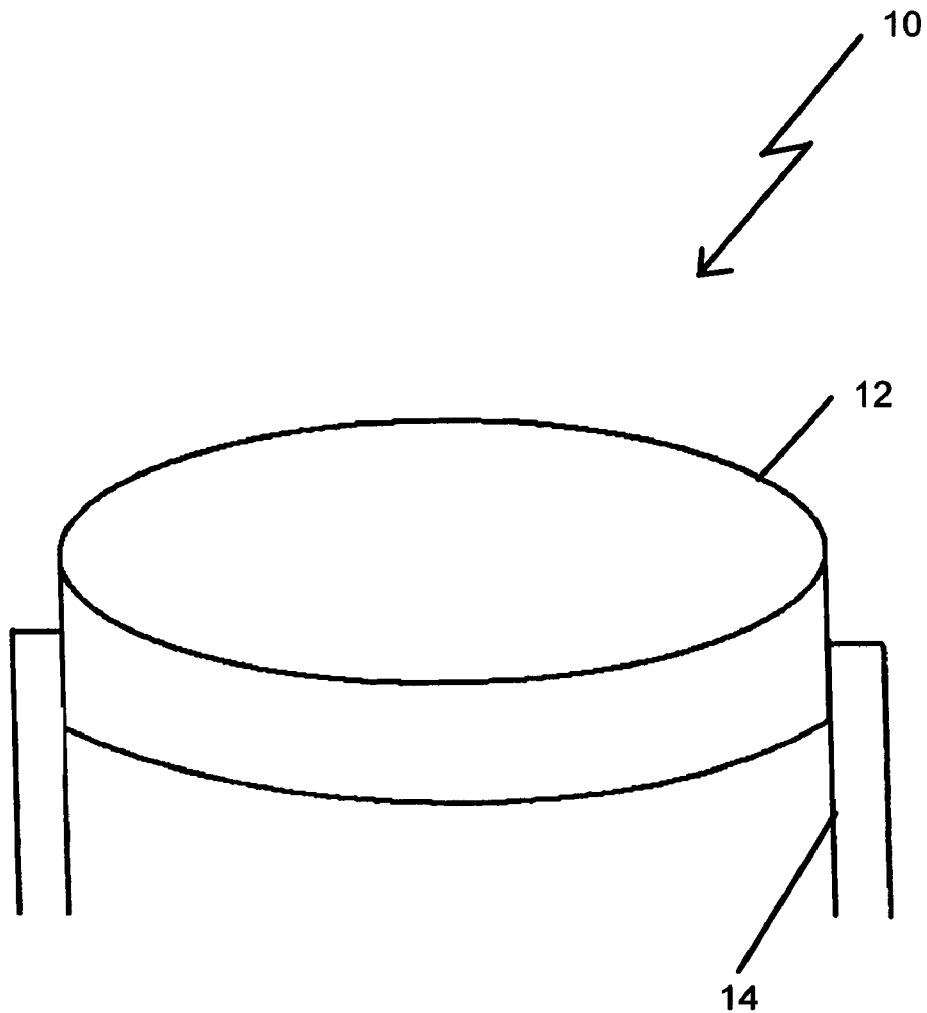

DISSOLVING DRAIN PLUG

This application claims priority from Canadian Application Serial No. 2,535,439 filed Jan. 27, 2006.

FIELD OF THE INVENTION

The present invention relates to a drain plug that dissolves and a method of using the same.

BACKGROUND OF THE INVENTION

U.S. Pat. No. 5,860,173 (Herring 1999) entitled "Bubble bath dispenser" discloses a drain plug that has a cavity into which bubble bath is placed.

SUMMARY OF THE INVENTION

According to one aspect of the present invention there is provided a dissolving drain plug which includes a body made of a material which is adapted to dissolve within a specific time interval when exposed to a specific liquid solvent.

According to another aspect of the present invention there is provided a method of preventing over exposure to liquid. A first step involves providing a dissolving drain plug comprising a body made of a material which is adapted to dissolve within a specific time interval when exposed to a specific liquid solvent. A second step involves placing the dissolving drain plug in a drain of a liquid container. A third step involves filling the liquid container with the liquid solvent. A fourth step involves placing into the liquid container one of an object or a person, the liquid solvent dissolving the drain plug and permitting the liquid solvent to pass through the drain of the liquid container after passage of the time interval.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

THE FIGURE is a side elevation view, in section, of a dissolving drain plug fabricated in accordance with the teachings of the present invention.

DETAILED DESCRIPTION OF THE PREFERRED EMBODIMENT

The preferred embodiment, a dissolving drain plug generally identified by reference numeral 10, will now be described with reference to THE FIGURE.

Structure:

Referring to THE FIGURE, dissolving drain plug 10 consists of a generally cylindrical body 12 made of a material which is adapted to dissolve within a specific time interval when exposed to a specific liquid solvent. The drain in which drain plug 10 is situated is indicated by reference numeral 14.

Sample I

A cylindrical mould was prepared that was of the size to fit a drain opening. Knox (Trade Mark) brand gelatin was placed in the mould. The gelatin drain plug formed from the mould was then allowed to harden. In testing, this type of gelatin drain plug dissolved in a time interval of between three and five minutes.

Sample II

The same cylindrical mould was used. Knox (Trade Mark) brand gelatin was used. However, in order to increase the time interval, a pharmaceutical grade dissolving polymer plastic, namely, pharmaceutical grade polypropylene was added. The gelatin/polypropylene drain plug dissolved in a time interval of between thirteen minutes and twenty minutes. The time interval can be varied by altering the amount of polypropylene added and the thickness of the drain plug. Although polypropylene was added, it will be appreciated that there are other food grade plastics intended to dissolve in a person's stomach that would work equally well.

Sample III

This sample was prepared to demonstrate how additives can be placed in the dissolving drain plug. The forming techniques and the formulation was the same as with sample II. There was added ground fragrant bath salts. The source of the fragrant bath salts was a product known as a "bath fizzy". As the name implies, the bath salts "fizzed" as they dissolved.

Operation:

In situations in which persons or objects are placed in a liquid and over exposure can be harmful, dissolving drain plug 10 provides a solution.

The preferred method of use to prevent over exposure to liquid involves the following steps:

A first step involves providing a dissolving drain plug as described above.

A second step involves placing the dissolving drain plug in a drain of a liquid container.

A third step involves filling the liquid container with the liquid solvent.

A fourth step involves placing into the liquid container one of an object or a person, the liquid solvent dissolving the drain plug and permitting the liquid solvent to pass through the drain of the liquid container after passage of the time interval.

Some applications for the dissolving drain plug and its method of use include:

Hand Washing

Many articles of clothing, such as woolen sweaters, come with directions that require washing by hand. However, if the woolen sweater is left soaking in water for too long the dye will begin to run and there may be a loss of fabric sizing (shrinkage). It is not uncommon for a person doing hand washing to be called away to answer the door, the telephone or attend to the needs of other family members. In such a case, the dissolving drain plug will release water from the sink before damage is done.

Water Running

In order to fill a sink or bathtub, one must leave the water running. It is not uncommon for a person filling a sink or bathtub to be called away to answer the door, the telephone or attend to the needs of other family members. In such a case, the dissolving drain plug will release water from the sink or bathtub before the water has a chance to overflow.

Dark Room

When developing photographic film, the photographic print must be placed in a liquid path for a set time interval. If the time interval is too short, the print will not be fully developed. If the time interval is too long, the print will be over developed. Since this timing is critical the use of a dissolving plug with the required time interval simplifies the developing procedure.

Items Left to Soak

There are various items that are left to soak as part of their cleaning process. One example of such an item is a metal baking pans. Food tends to stick to the baking pans. The baking pans become easier to clean if the baking pans are left soaking in water, which is a liquid solvent. However, if left soaking for too long the metal baking pans will rust. A dissolving drain plug with an appropriate time interval would release the water from the sink and avoid this rusting problem.

Bathtub Safety

A full bathtub presents a potential hazard to infant children. It is not unusual for persons to forget to drain the bathtub after getting out of their bath. A dissolving drain plug ensures that the water is released from the bathtub. Even an adult, may find him or herself feeling faint after soaking in a hot bathtub. The dissolving drain plug ensures that water is released, which reduces the possibility of drowning.

Alzheimers

There are many day to day task involving sinks and bathtubs that a person in the early onset of alzheimers disease will forget to return to. For a forgetful person, a dissolving drain plug will avoid many common problems, some of which are outlined above.

Variations:

A variation is to place a chemical additive into the dissolving drain plug. Some examples of are:

Bath Additives

It is common to place in a bathtub bath salts, bubble bath, and other chemicals that make the bath more luxurious.

Medications

It is common in hospital setting to add medications to the water of a bath, in order to administer such medications to the patient while soaking. These medications are used to treat such ailments as yeast infections and skin conditions.

In this patent document, the word "comprising" is used in its non-limiting sense to mean that items following the words are included, but items not specifically mentioned are not excluded. A reference to an element by the infinite article "a" does not exclude the possibility that more than one of the elements is present, unless the context clearly requires that there be one and only one of the elements.

It will be apparent to one skilled in the art that modifications may be made to the illustrated embodiment without departing from the spirit and scope of the invention as hereinafter defined by claims.

What is claimed is:

1. A dissolving drain plug, comprising;
a body made of a material which is adapted to dissolve within a specific time interval when exposed to a specific liquid solvent, the body having a cylindrical portion adapted to plug a drain opening, wherein the material out of which the body is made comprises an additive, wherein the additive is one of bath salts or a fragrance, or the additive has medicinal qualities.

2. The dissolving drain plug as defined in claim 1, wherein the material is a gelatin.

3. The dissolving drain plug as defined in claim 1, wherein the material is a pharmaceutical grade dissolving polymer plastic.

4. The dissolving drain plug as defined in claim 1, wherein the material is a mixture of gelatin and a pharmaceutical grade dissolving polymer plastic.

5. The dissolving drain plug as defined in claim 1, wherein the liquid solvent is water.

6. The dissolving drain plug as defined in claim 1, wherein the time interval is between 3 and 20 minutes.

7. A dissolving drain plug, comprising:
a body made of a mixture of gelatin and pharmaceutical grade dissolving polymer plastic which is adapted to dissolve within three minute to twenty minute time interval when exposed to water and an additive, wherein the additive is bath salts or a fragrance, or the additive has medicinal qualities, the body having a cylindrical portion adapted to plug a drain opening.

* * * * *